Inventors:
Stanley M. Antczak
Albert E. Getzendiner
Marvin C. Riggert
by J.F. McDevitt
Their Attorney

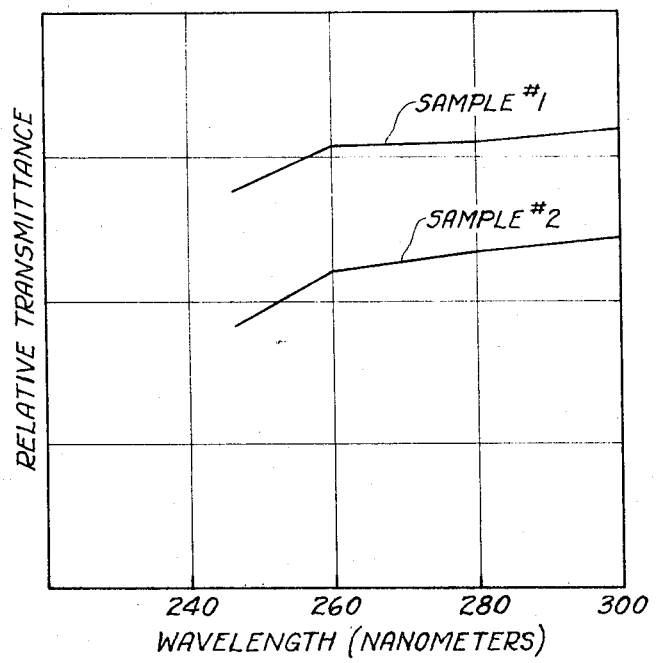

United States Patent Office 3,764,286
Patented Oct. 9, 1973

3,764,286
MANUFACTURE OF ELONGATED FUSED QUARTZ MEMBER
Stanley M. Antczak, Mentor, Albert E. Getzendiner, Mayfield Heights, and Marvin C. Riggert, East Cleveland, Ohio, assignors to General Electric Company
Filed Apr. 22, 1971, Ser. No. 136,468
Int. Cl. C03b 5/16
U.S. Cl. 65—134                                   4 Claims

ABSTRACT OF THE DISCLOSURE

An elongated fused quartz product is disclosed having improved optical transmission and dimensional uniformity which can be produced continuously by a novel process in the form of tubing, rods and the like from purified sand melted in an induction heated furnace. The present process further employs particular hydrogen-helium atmospheres in which the sand particles are continuously melted and drawn from the induction heated furnace to provide the final desired shape. Reheating of the drawn article is practiced to remove entrapped gas for improvement of the final properties.

BACKGROUND OF THE INVENTION

Various elongated members have been formed continuously by melting a pure grade of quartz crystal or sand in an electrically heated furnace whereby the desired shape is drawn from the furnace through a suitable orifice or die in the bottom of the furnace as the raw material is being melted. In a known method and apparatus for continuous production of fused quartz tubing, for example, a tungsten-lined molybdenum crucible supported vertically and having a suitable orifice or die in the bottom to draw cane, ribbon or tubing is surrounded by an arrangement of tungsten rods connected in parallel to a suitable electric power supply which heats the crucible. The crucible together with its heating unit is encased in a refractory chamber supported by a water-cooled metal jacket and the crucible together with its contents of crystalline quartz is heated to a temperature of about 2000° C. in a reducing atmosphere of nitrogen and hydrogen, for example. While the product obtained by this method is not free of bubbles and ridges, it is called "clear" to distinguish said material from the less optically transparent product obtained if purified sand is employed as a starting material. Much need remained for greater improvement in reducing the aforementioned optical discontinuities. Additionally, a further lack of optical homogeneity could be observed in clear fused quartz tubing produced by the above-described method in the form of stria, visible grain structure, and optical strain which becomes visible under polarized light examination.

An improved method and apparatus is also known which provides clear fused quartz tubing continuously by feeding natural quartz crystal in ¼ to ½ inch diameter pieces into a refractory metal crucible heated by electrical resistance means but which is further accompanied by using different composition gas atmospheres when melting and drawing the fused material to reduce the bubble content. More particularly, the bubbles formed by gas entrapment between crystals in the molten viscous mass of fused quartz do not escape as readily as from molten glasses having lower viscosity and hence remain as elongated bubbles or ridges in the product drawn from the fused quartz melt. By substituting a gas as the melting atmosphere which diffuses readily through the molten material such as pure helium, pure hydrogen or mixtures of these gases, it has been possible to reduce the gas pressure in the bubbles and thereby reduce the bubble size somewhat by this diffusion mechanism. Said improved process utilizes a mixture of 80% helium and 20% hydrogen, by volume, wherein said gas mixture is caused to flow at slightly greater than atmospheric pressure into the top of the crucible member where the raw material is being melted with a second gas mixture being supplied around the exterior of said crucible member to prevent oxidation of the refractory metal. The second gas mixture consists of hydrogen being carried in a non-oxidizing gas such as nitrogen at ratios up to about 20% hydrogen by volume and said gas mixture also provides the atmosphere in which the product is being drawn. Purified sand has also been fused by the latter described method with an improvement being obtained in reduced size and content of bubbles in the drawn product.

Both of the above-summarized methods produce wide fluctuations in product uniformity, however, and while the second method represents a general improvement over the first method, there still remains considerable need for more reliable means to provide elongated fused quartz members having uniformly better physical and optical characteristics. A particularly serious problem encountered with both prior art methods is fluctuation in the cross-sectional shape and size of the rod, ribbon, tubing or other configuration being drawn which required continuous inspection of the product being obtained and substantial rejection of material which does not meet the existing market specifications. The elongated bubbles and ridges found in products drawn by either prior art method also fluctuated widely and caused further rejection of material especially when the product was intended for use to contain electric discharge devices such as high pressure mercury vapor electric discharge type lamps.

SUMMARY OF THE INVENTION

An important object of the present invention is to provide a superior product in the form of an elongated fused quartz member having improved dimensional tolerances and desirable optical characteristics. A further object is to provide an improved process for drawing an elongated fused quartz member having greater uniformity in dimensions and optical properties wherein the starting material used in said process can be readily and economically prepared. Still another important object of the invention is to provide a method of improcing end use properties for an elongated fused quatz product drawn in accordance with practice of the present invention.

An elongated fused quartz member is provided according to the invention having dimensional variation not in excess of ±3% for the external cross-section measurement, improved resistance to reduction of optical transmission in the ultraviolet region of the spectrum and optical homogeneity characterized by relative freedom from stria, visible strain under polarized light examination, and grain structure. The method of the invention by which said improved product is obtained comprises continuously feeding a raw material of essentially pure silicon dioxide in particulate form at a predetermined rate into the top section of an induction heated crucible, fusing the raw material continuously in an upper induction heated zone of the crucible in an atmosphere of hydrogen and helium having a particular compositional range while maintaining a fusion temperature not below approximately 2050° C., continuing to heat the fused material in a lower zone of the crucible being heated by separate induction heating means to provide independent regulation of the temperature in the fused material and drawing the fused material continuously from said lower zone of the crucible through forming means in the presence of an atmosphere of hydrogen contained in a non-oxidizing carrier gas. Supplemental heat treatment of the product drawn in said manner produces evolution of the entrapped gases to provide improved utilization properties of the treated material.

BRIEF DESCRIPTION OF THE DRAWINGS

FIG. 2 of the drawings illustrates optical transmission characteristics in the ultraviolet region of the spectrum for two fused quartz products prepared by different methods after exposure to high energy radiation.

DESCRIPTION OF THE PREFERRED EMBODIMENTS

Figure 1:
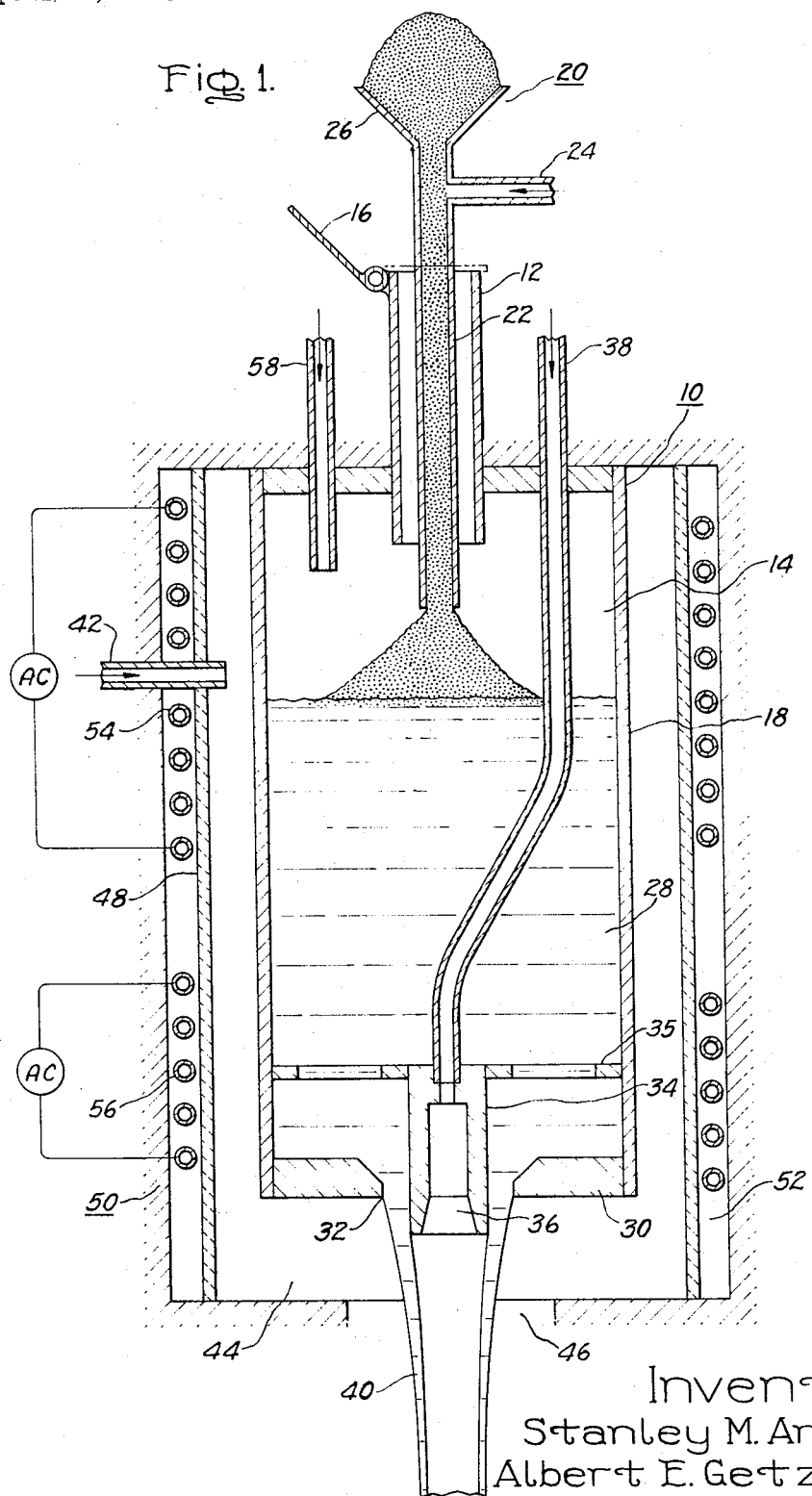
In FIG. 1 of the drawings which accompanies and forms part of the specification, a furnace apparatus is shown for practicing the present invention and which can be constructed by already known fabricational techniques. In said drawing, the furnace is illustrated in a longitudinal sectional schematic view.

In one of its preferred embodiments, the fused quartz product of the present invention can be formed in a furnace configuration having the features shown in the drawing. More particularly, said furnace configuration can have a general cylindrical shape such as disclosed in U.S. Pat. 2,998,469 issued Aug. 29, 1961 which includes an elongated cylindrical melting crucible 10 which is preferably constructed of a refractory metal such as tungsten or molybdenum as well as combinations thereof, such as a tungsten-lined molybdenum sheet into which a purified sand raw material is fed through a top opening 12 into an upper melting zone 14 of said crucible member. Said top opening 12 is provided with movable closure means 16, such as a trapdoor which can be kept closed except for observing the level of the melt 18 and during feeding of the raw material into the crucible. Automatic feeder means 20 are provided at said top opening of the crucible member to maintain a predetermined level of the raw material in the crucible. Said feeder means includes a discharge tube 22 having its outlet opening located within said crucible so as to provide the raw material in the upper zone where melting takes place, a purge gas inlet tube 24 and reservoir means 26 which contains a supply of the raw material being fed automatically to the discharge tube. Simple gravity flow of the raw material to the melting zone of the crucible member takes place as the melt level in the crucible drops with fusion of the sand particles so that it becomes unnecessary to incorporate any further means to adjust the rate of feeding the raw material as described. The purge gas being supplied to the feeder helps eliminate gases contained in the raw material which could otherwise oxidize the refractory metal components of the crucible member or form bubbles in the fused quartz melt which cannot thereafter be removed or minimized in a manner to be described in part immediately hereinafter. The composition of said purge gas is the same or similar to that admitted elsewhere to the upper zone of said crucible member for the purpose of reducing bubbles and ridges in the final product and which consists of a gas mixture of hydrogen and helium in the volume ratios 40–65% hydrogen and 60–35% helium.

The lower portion 28 of said crucible member includes an annular ring 30 having central opening 32 through which the elongated fused quartz member is continuously formed by drawing the viscous material through said opening. A core 34 is centrally disposed in the opening 32 and extends below the annular ring as the means of forming tubing from the viscous material being drawn from the melt. Support means 35 are affixed to the wall of the crucible and provide rigid support of the core which helps to maintain a constant size opening from which the product is being drawn. The core is fabricated with a hollow interior 36 which is connected to inlet pipe 38 so that supply of non-oxidizing gas having a different composition than supplied to the melting zone of the crucible can be furnished as a forming atmosphere while the tubing 40 is being drawn. A second inlet pipe 42 supplies the same type forming atmosphere which can be a mixture containing hydrogen in a non-oxidizing carrier gas such as nitrogen in volume ratios 1–20% hydrogen and 99–80% carrier gas as a protective atmosphere which surrounds the exterior wall of the crucible. This supply of forming gas is provided to annular space 44 which provides a housing means for the crucible and includes a central bottom opening 46 providing exhaust means from said cavity for the forming gas in a manner which envelopes the exterior surface of the elongated fused quartz member being drawn from the furnace. The exterior wall of said annular space comprises a refractory cylinder 48 which in combination with exterior housing 50 of the furnace construction serves as the container means for the induction heating coils of the apparatus. More particularly, a concentric passageway 52 is defined between the exterior wall of refractory cylinder 48 and the interior wall of housing 50 in which is disposed two helical-shaped induction heating coils 54 and 56 supplying separate heating sources for the upper and lower zones of the crucible, respectively. Said heating sources and the power supplies thereto can be of conventional construction which include electrical conductors that are hollow for water cooling being electrically connected to separate A.C. power supplies for the independent heating utilized in the practice of the present invention. The remainder of the passageway occupied by said coils is preferably packed with a stable refractory insulation such as zirconia in order to conserve heat in the furnace construction. A third supply pipe 58 is located in the top section of exterior housing 50 and supplies the same or similar purge gas mixture to the melting zone of the crucible as provided by inlet pipe 24. The above-described furnace is operated in connection with conventional tube or rod drawing machinery which has been omitted from the drawing as forming no part of the present invention.

In accordance with carrying out the process of the present invention in the above-described apparatus, a natural silica sand having a nominal particle size of −50 mesh U.S. screen size which has been purified by chemical treatment to the nominal impurity content below listed is supplied to the top opening of the crucible member in the apparatus.

RAW MATERIAL

| Impurity | Content (p.p.m.) |
|---|---|
| $Fe_2O_3$ | 5 |
| $TiO_2$ | 2 |
| $Al_2O_3$ | 50 |
| CaO | 7 |
| MgO | 2 |
| $K_2O$ | 4 |
| $Na_2O$ | 4 |
| $Li_2O$ | <1 |
| B | 0.5 |
| $ZrO_2$ | <1 |

The above raw material is provided to the crucible member which has been heated in excess of 2050° C. while also being supplied with the hydrogen and helium gas mixture hereinbefore specified. After a predetermined melt level of fused quartz has been established in the crucible and the molten material caused to flow by gravity through central bottom opening 32 in the crucible member, then tubing is drawn continuously by the drawing machine (not shown) in the presence of a forming gas atmosphere as hereinbefore specified. In any continuous drawing of tubing in the foregoing described manner, the electrical power being supplied to the lower heating coil 56 is maintained at a lower level than the electrical power being supplied to the upper heating coil 54 in order to lower the temperature of the material as it is being drawn below a temperature of 2050° C. or higher being maintained in the melting zone of the crucible. The combined effect of these process steps whereby the level of raw material in the crucible is maintained relatively constant while distinct temperature zones are maintained during the drawing operation has been found to permit outside diameter variation in the tubing drawn to less than about ±3% over various sizes of tubing. Furthermore, the concentricity in both diameters has remained uniform over long periods of operation with all said uniformity representing distinct improvements over any known prior art method of drawing fused quartz tubing. The abovedescribed process steps of the present invention are also believed to cooperate with the particular gas atmospheres employed in said process to significantly reduce the elongated bubbles and ridges which can vary significantly in this type tubing.

The cause of these elongated bubbles and ridges in the rod or tubing appears to be due to gas entrapment in the void spaces between the particles of raw material being melted. In the prior art methods above described, the entrapped gas could not readily rise through and escape from the molten mass by reason of its high viscosity and the heating of the fused mass to higher temperatures to reduce viscosity was not utilized because of the attendant higher silica vaporization at such temperatures. The particular gas mixture employed in one prior art method heretofore referenced helps remove the bubbles by diffusion of the selected gases through the molten material. While the specified gas mixture in that process of 80% helium and 20% hydrogen reduces elongated bubbles in the product, it has been found to do so at the expense of experiencing more ridges which constitute a different form of optical and physical defects in the product. By increasing the hydrogen content of the gas mixture used when melting raw material according to this invention an optimum result is obtained between bubble and ridge formation so that a reduction in both defects is experienced when said gas mixture contains volume ratios in the range 40–65% hydrogen and 60–35% helium. To provide further indication of the results obtained with a particular mixture in the range specified, a 40% hydrogen and 60% helium mixture provided air line improvement but more ridges than when the product was obtained with a gas mixture of 53% hydrogen and 47% helium. The product obtained with a gas mixture of 60% hydrogen and 40% helium exhibited greater air line defects but improvement in freedom from ridges when compared with the product obtained with a 53% hydrogen and 47% helium gas mixture.

While the air line and ridge improvements obtained by selection of an optimum gas mixture in which to fuse the raw material is not understood, it may be attributable in part to escape of hydrogen gas through the wall of the crucible member by diffusion. More particularly, by increasing the hydrogen content of said gas mixture over that employed heretofore it becomes possible for a greater proportion of the gas mixture to escape from the melt by diffusion through the crucible wall since helium cannot diffuse through a refractory metal whereas hydrogen can do so. Since the forming gas atmosphere utilized in carrying out the present process has a lower hydrogen content than contained in the melt atmosphere, the hydrogen diffusion through the crucible wall is thereby facilitated which contributes to bubble and ridge elimination from the product. It has additionally been observed that increasing the rate at which fused material is drawn during the process reduces the bubble content of the product.

An examination of the product obtained according to the present invention finds still further uniformity in improved physical properties. Conventional polaroscopic inspection of the product with plane polarized light determined it to be relatively homogeneous in character by reason of relative freedom from stria, visible strain and absence of grain structure which can be found in other fused quartz products. A comparison was also conducted of optical transmittance in the ultraviolet region between a sample piece of tubing obtained in accordance with the present invention and a comparable sample of tubing prepared by the latter prior art method above described. The samples were obtained from fused quartz tubing having a nominal dimension of 7.75 mm. I.D. and a 1.0 mm. wall thickness which had been exposed to X-ray radiation provided by a General Electric CA–7H model Coolidge tube for a 15-hour time period. The voltage applied to said tube during the exposure was 50 kilovolts and the tube current was 30 milliamperes. After such exposure, the tubing samples were split lengthwise and transmittance measurements in the ultraviolet portion of the spectrum were made using a Beckman DK–1A spectrophotometer fitted with an integrating sphere provided by the same manufacturer. Because the transmittance measurements were made by light passage through the wall of specimens having a significant amount of curvature, the results reported in FIG. 2 of the drawings do not represent optical transmittance directly but are expressed only in terms of relative transmittance. Said relative transmittance is defined as the average change of the transmittance value for each sample obtained over the wavelength intervals 245–255 nanometers, 270–280 nanometers, mand 295–305 nanometers by calculating the difference in optical transmittance within the particular interval. The Sample #1 values in FIG. 2 pertain to the product of the present invention and evidence greater resistance to radiation damage than the lower transmittance obtained with the Sample #2 product obtained by a prior art method. Resistance to radiation damage has significance for mercury arc lamp applications of the fused quartz tubing wherein there is considerable emission of ultraviolet radiation which can lead to deterioration in the optical transmittance of the fused quartz envelope especially in the ultraviolet region with accompanying reduction of light output from the lamp. The same type deterioration is produced upon exposure of the fused quartz to higher energy radiation such as X-rays, ionizing radiation, and nuclear radiation but to a more significant degree so that better resistance of the material to said higher energy radiation can be expected to improve performance for the aforementioned type lamp applications.

When a piece of fused quartz produced in accordance with the present invention was heated in a hydrogen atmosphere to a temperature at which deformation of the fused material began, there was some growth of the elongated bubbles originally present. By contrast thereto, when the same product was reheated to approximately 1000° C. in ordinary air before remelting in a hydrogen atmosphere then some reduction of the hydrogen content in the elongated bubbles was believed to occur by diffusion since there was a disappearance of some bubbles. A related evaluation conducted when reheating the products of the present invention in a vacuum up to approximately 1000° C. found hydrogen gas evaluation which was not accompanied by evolution of either carbon monoxide or water as was found with products prepared by the aforementioned prior art methods.

While the best mode contemplated by applicants for carrying out the present invention has been set forth above, it will be understood that additions, changes and modifications may be made thereto by those skilled in the art without departing from the spirit and scope of the invention as defined in the appended claims. For example, it will be apparent that a different raw material can be substituted for the purified natural sand herein disclosed so long as the purity specifications of the fused quartz provide an acceptable product for the purpose desired. Quartz crystal in small diameter pieces or quartz crystal powder would provide satisfactory substitute raw materials for practice of the present invention. Nor is it intended to limit practice of the present invention to the utilization of separate and distinct induction heating coils in order to establish independent heating zones for the melting and forming operations since it is possible to do so by otherwise known techniques with a single induction heating coil having separate electrical taps connected to a single power source. Likewise, different inert gases can be substituted for the nitrogen employed as a carrier gas in the forming atmosphere to achieve comparable results. It will be

What we claim as new and desire to secure by Letters Patent of the United States is:

1. A continuous method of forming an elongated fused quartz member which comprises:
   (A) continuously feeding raw material consisting essentially of silicon dioxide in particulate form at a predetermined rate into the top scetion of an induction heated crucible,
   (B) fusing said raw material continuously in an upper induction heated zone of the crucible being supplied with a gas atmosphere of hydrogen and helium in the volume ratios of 40–65% hydrogen and 60–35% helium while maintaining a fusion temperature thereat not below approximately 2050° C.,
   (C) continuing to heat the fused material in a lower zone of said crucible heated by separate induction heating means so as to maintain a lower temperature in the fused material, and
   (D) drawing the fused material continuously from said lower zone of the crucible through forming means in the presence of an atmosphere containing hydrogen in a non-oxidizing carrier gas.

2. A method as in claim 1 wherein the forming means consist of a core and die.

3. A method as in claim 1 wherein a portion of the gas bubble growth which is ordinarily encountered upon fussion of the raw material is avoided by increasing the draw rate from the crucible.

4. A method as in claim 1 wherein the atmosphere in which the fused material is drawn also surrounds the exterior crucible wall.

References Cited

UNITED STATES PATENTS

| | | | |
|---|---|---|---|
| 3,212,871 | 10/1965 | Vatterodt | 65—32 |
| 2,038,627 | 4/1936 | Badger | 65—135 |
| 2,485,851 | 10/1949 | Stevens | 65—134 |
| 1,992,994 | 3/1935 | Delpech | 65—134 |
| 3,205,292 | 9/1965 | Descarsin | 65—136 |
| 3,128,169 | 4/1964 | Heraeus et al. | 65—134 |
| 3,320,045 | 5/1967 | Weiss et al. | 65—33 |
| 2,852,891 | 9/1958 | George | 65—32 |
| 3,395,997 | 8/1968 | Bryant et al. | 65—32 |
| 1,536,821 | 5/1925 | Devers | 65—18 |

S. LEON BASHORE, Primary Examiner

K. M. SCHOR, Assistant Examiner

U.S. Cl. X.R.

65—32, DIG. 8, DIG. 9